United States Patent [19]

Williamson

[11] Patent Number: 5,256,025
[45] Date of Patent: Oct. 26, 1993

[54] HANDTRUCK

[76] Inventor: Gary Williamson, 14644 N. 83rd La., Royal Palm Beach, Fla. 33411

[21] Appl. No.: 940,013

[22] Filed: Sep. 3, 1992

[51] Int. Cl.⁵ .............................................. B62B 1/10
[52] U.S. Cl. ................................... 414/490; 298/2; 298/3; 280/47.29; 280/47.28
[58] Field of Search ............... 414/490; 298/2, 3, 5; 280/47.24, 47.26, 47.27, 47.28, 47.29

[56] References Cited

U.S. PATENT DOCUMENTS

| | | | |
|---|---|---|---|
| 1,006,985 | 10/1911 | Smith | 298/2 |
| 1,150,539 | 8/1915 | Ross | 280/47.29 |
| 1,497,478 | 6/1924 | Bludworth | 298/3 |
| 1,653,927 | 12/1927 | Pryor | 280/47.29 |
| 1,704,139 | 3/1929 | Morrow | 280/47.29 |
| 1,710,893 | 4/1929 | Phillips | |
| 2,240,355 | 4/1941 | Swimley | |
| 2,392,955 | 1/1946 | Stakup | 280/47.29 |
| 2,682,348 | 6/1954 | Stumphauzer | |
| 2,766,063 | 10/1956 | Greeley | 298/2 X |
| 2,813,647 | 11/1957 | Hauck | |
| 2,834,494 | 5/1958 | Peters | |
| 2,838,193 | 6/1958 | Statton | |
| 2,953,267 | 9/1960 | Gorman | |
| 3,112,042 | 11/1963 | Leshner | |
| 3,308,978 | 3/1967 | Smith, Jr. | |
| 3,403,800 | 10/1968 | Botello | |
| 3,486,651 | 12/1969 | Gottinger | |
| 3,844,431 | 10/1974 | Crawford | |
| 3,878,958 | 4/1975 | Ring | |
| 4,355,941 | 10/1982 | Lehman | 414/490 |

FOREIGN PATENT DOCUMENTS

| | | |
|---|---|---|
| 667,386 | 2/1952 | Great Britain. |
| 404,928 | 4/1932 | Great Britain. |
| 194,322 | 3/1957 | Austria. |

Primary Examiner—Frank E. Werner
Attorney, Agent, or Firm—Quarles & Brady

[57] ABSTRACT

An improved handtruck having an unloader mechanism for assisting in the removal of cargo from the handtruck. The unloader mechanism utilizes a cargo support pivotally mounted at the lower end of the handtruck. The cargo support is designed so that it can be maintained in a latched position when transporting cargo and can be unlatched to pivot away from the handtruck when unloading cargo. A pusher structure may be operatively connected to said cargo support to facilitate the removal of cargo from said cargo support. The pivot action of the cargo support causes a force to be exerted on the cargo by the pusher structure which urges such cargo down an inclined plane formed by the cargo support, thereby removing the cargo from the handtruck.

12 Claims, 5 Drawing Sheets

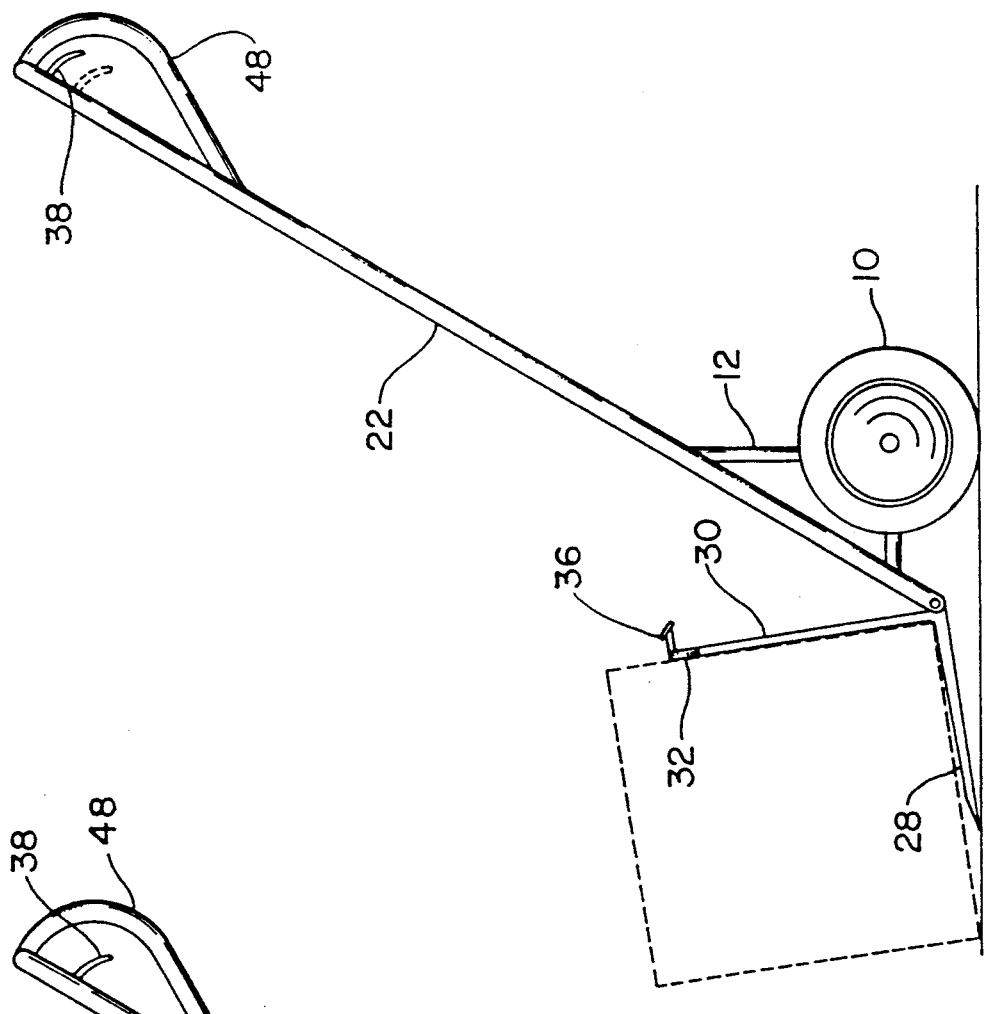
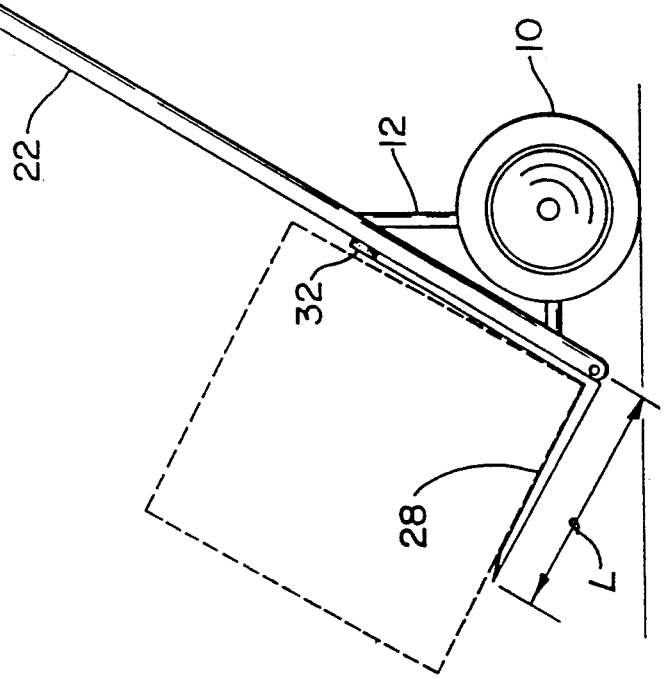

HANDTRUCK

BACKGROUND OF INVENTION

Ordinary handtrucks suffer from a common problem relating to the removal of cargo once the handtruck has reached its destination. In particular, when it is desired to remove cargo from a handtruck, the cargo must somehow be lifted or slipped off of the handtruck base plate. In the case of heavy cargo, the frictional forces between the cargo and the base plate will in some cases cause difficulty in sliding the cargo off the plate. When this occurs a second worker may be required to lift or slide the cargo away from the handtruck to release the base plate and allow the handtruck to be removed from beneath the cargo. Even when a second worker is not necessary to remove the cargo, the handtruck must commonly be rocked from side to side to allow its base plate to slide out from beneath the cargo. This slows the unloading operation and creates additional work for the handtruck user.

Where cargo is light in weight, a problem may also arise in its removal from the handtruck. This can occur where the cargo is not heavy enough to allow the portion of the cargo extending beyond the base plate to generate adequate frictional force against the ground to cause the cargo to remain stationary while the handtruck base plate is pulled out from underneath. In such cases the cargo must be manually lifted or pushed off of the handtruck.

In addition, ordinary handtrucks suffer from a common problem which arises when it is desired to place cargo directly adjacent to a wall. In order to remove the handtruck from beneath cargo, the top portion of the handtruck is commonly angled inwardly toward the cargo while being pulled away to assist cargo in sliding off the handtruck base. However, in order to angle the handtruck in this manner, the cargo cannot be placed directly adjacent to the wall because the top portion of tall cargo will prevent the handtruck from being angled toward the wall. Thus, it is necessary to have space between the wall and the cargo to allow the handtruck to be tilted forward and removed.

The prior art in handtruck unloader mechanisms has included various mechanisms adopted to solve the above stated problems. See, for example, U.S. Pat. Nos. 4,355,941 and 3,844,431. However, these mechanisms typically only provide means to push cargo off the handtruck base plate. A significant effort is required to push the cargo off the base plate. In addition, the prior art in some cases has involved complex pusher mechanisms which necessarily increase the cost to manufacture such handtrucks.

The present invention is designed to alleviate the problems found in handtrucks of the prior art and provides a handtruck capable of efficiently unloading cargo in the precise location desired without adding undue expense to its manufacture.

SUMMARY OF THE INVENTION

The present invention relates to an improved handtruck which includes a means for the removal of cargo. The improved handtruck is comprised of an elongated frame having handle portions at one end and wheels mounted adjacent to the opposite end. At the end of the frame where the wheels are mounted, a cargo support is pivotally mounted adjacent to said wheels. The cargo support can be placed in a latched position which maintains the cargo support substantially perpendicular to the frame of the handtruck. The cargo support is maintained in the latched position while cargo is being transported on the handtruck. When it is desired to unload the handtruck cargo, the cargo support is unlatched to allow the cargo support to pivot forward with respect to the handtruck frame when the frame is angled away from the cargo. This pivoting action causes the portion of the cargo support attached to the frame to rise up off the ground and form an inclined plane. The inclined plane allows the cargo to be easily removed from the cargo support. In addition, the cargo support may have a pusher structure operatively connected to the cargo support to force the cargo down the inclined plane formed by the cargo support when the frame is angled away from the cargo.

DESCRIPTION OF DRAWINGS

FIG. 2 is a side elevation view of the handtruck of FIG. 1 configured for transporting of cargo.

FIG. 3 is a side elevation view of the handtruck of FIG. 1 shown unloading cargo.

DETAILED DESCRIPTION OF THE INVENTION

Figure 1:
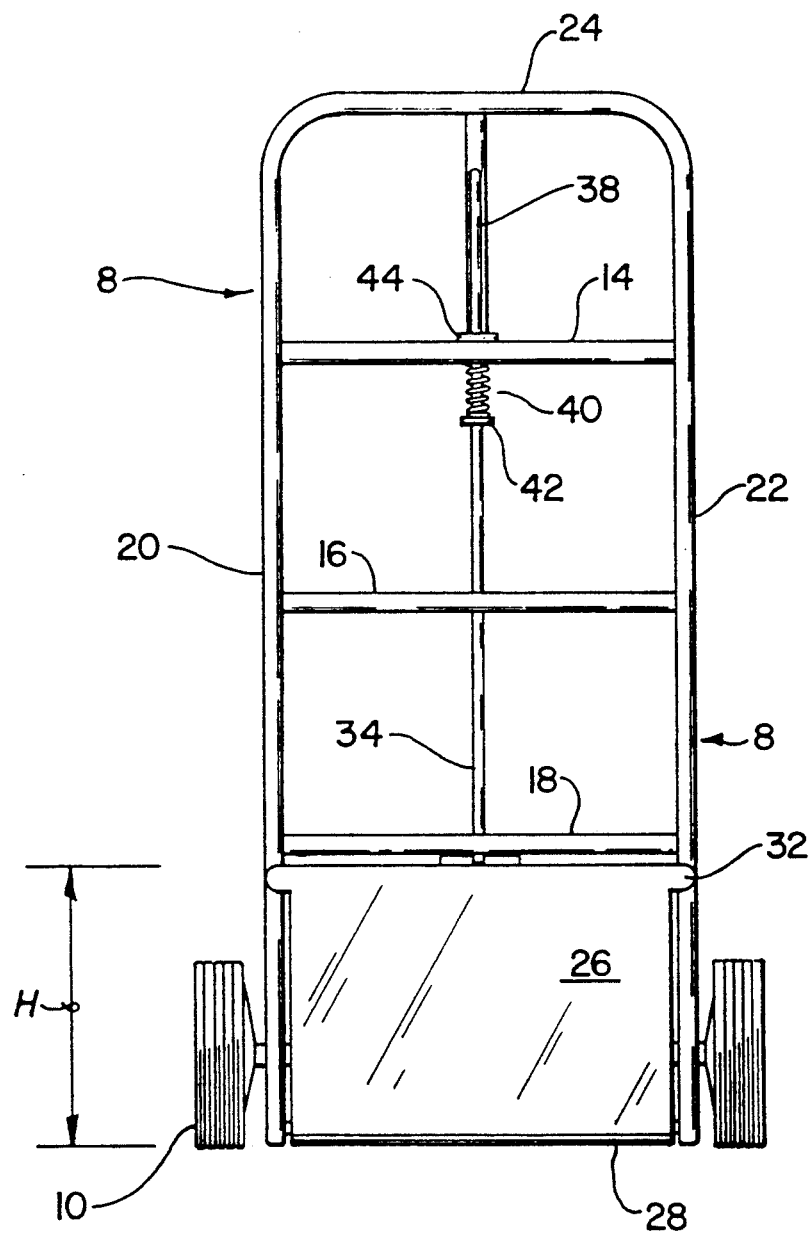
FIG. 1 is a front elevation view of a handtruck incorporating the invention.

A handtruck constructed in accordance with the present invention is shown in FIGS. 1-3. The handtruck includes an elongated frame 8 with wheels 10 rotatably mounted adjacent to one end of the frame on wheel supports 12. The frame 8 is shown as having an elongated rectangular shape in FIG. 1. However the invention is not so limited. Three support members 14, 16 and 18 ar preferably connected between the vertical frame members 20 and 22 to improve the structural rigidity of the frame.

Frame 8 may also include a frame handle 24 which can be integrally formed between vertical frame members 20 and 22 and, in a, preferred embodiment, may have a second U shaped loop handle 48 connected at one end to the center of the frame handle and connected at its other end to support member 14.

At the lower end of the frame 8, cargo support 28 is pivotally mounted. In a preferred embodiment, pusher structure 26 is operatively connected to cargo support 28 to aid in the removal of cargo from the cargo support. The pusher structure 26 in FIGS. 1-4 is shown as a flat plate. However the structure may be formed in any manner capable of pushing a load off of said cargo support 28 when said cargo support pivots forward.

In a further preferred embodiment, pusher structure 26 is configured to form an angle of substantially 90 degrees with cargo support 28 so that its surface lies substantially in the plane of frame 8 when the cargo support 28 is in its latched position. Retaining plates 32 can extend from the sides of the pusher structure 26 to prevent it from rotating backwards through the frame 8 towards wheels 10. However, the pusher structure 26 can be supported relative to the frame 8 by other suitable means.

Figure 5:
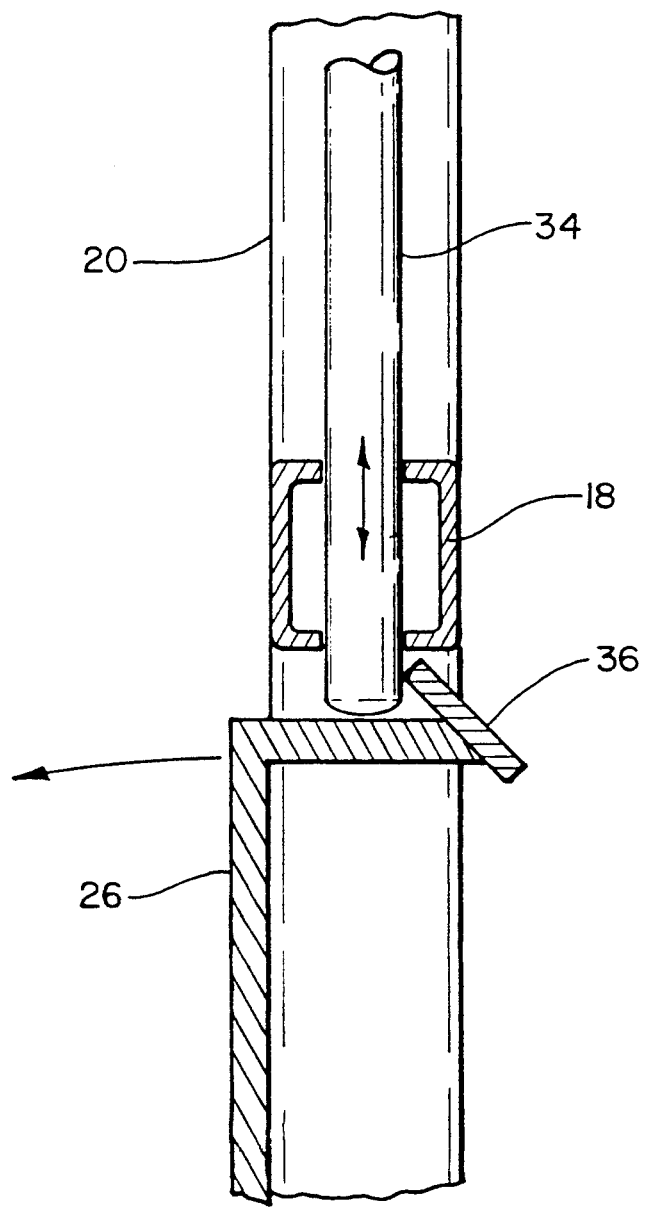
FIG. 5 is a detailed cutaway view of the handtruck latching mechanism.
Figure 6:
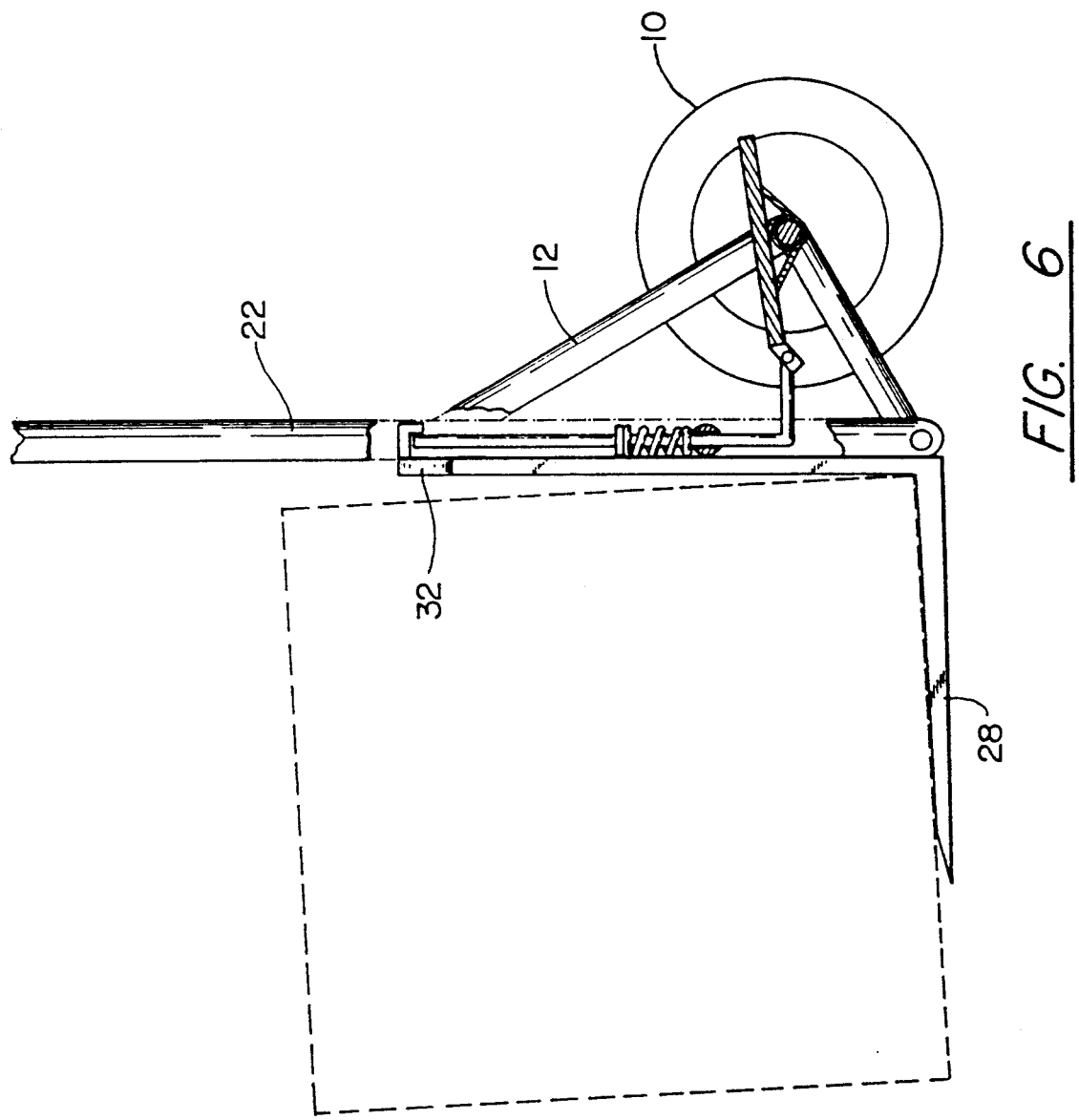
FIG. 6 is an embodiment of the handtruck wherein an alternative embodiment of the latching means is shown.

The cargo plate 28 can be maintained in a stationary position relative to the frame 8 by means of a latching mechanism as shown in FIGS. 1, 3 and 5. An elongated control rod 34 can be provided which extends through support members 14, 16, and 18 to engage a latch plate 36 mounted on the upper edge of the pusher structure 26. A control rod handle 38 integrally formed at the upper end of the control rod 34 allows a user to move the control rod 34 upwardly and cause it to clear latch plate 36. The control rod 34 is forcibly maintained in its downward position by means of retaining spring 40 fitted between spring plate 42 and support member 14. Retainer plate 44 limits the downward travel of control rod 34.

When the control rod 34 is disengaged from latch plate 36 it allows cargo support 28 and pusher structure 26 to pivot forward when frame 8 is angled in the opposite direction. The cargo support 28 and the pusher structure 26 can be returned to the latched position by pivoting the frame 8 forward, causing control rod 34 to ride up over latch plate 36 and then spring into place on the forward side of latch plate 36.

Numerous alternative latching means are also possible for use with the present invention. For example, a spring biased control rod activated by a foot pedal could be mounted to a lower portion of frame 8, behind the cargo support 28, to engage a latch plate on the rear surface 30 of the pusher structure 26. Likewise any suitable means for maintaining the cargo support 28 in a stationary position relative to the frame 8 can be used as a latch mechanism.

FIG. 2 shows a side view of the handtruck being used with the cargo support 28 in its latched position for carrying cargo. In this configuration the handtruck of the present invention operates in a substantially identical manner to ordinary handtrucks of the prior art.

In FIG. 3 cargo support 28 is shown in its unlatched position for removing cargo. By releasing the elongated control rod 34 from engagement with latch plate 36, cargo support 28 and pusher structure 26 are free to pivot forward as shown in FIG. 2 when the frame 8 is tilted rearwardly away from the cargo.

The handtruck of the present invention is operated in essentially the same manner as handtrucks of the prior art during loading and transporting operations. The user loads cargo onto the cargo support 28 and transports such cargo by tilting the frame 8 rearwardly so that the cargo support 28 clears the ground for ease of movement. However during unloading operations the advantages of the present invention become apparent. To unload cargo resting on the cargo support 28 in the present invention, a user places the handtruck in its upright position, grasps control rod handle 38 to disengage the control rod from latch plate 36 and pivots frame 8 downwardly while simultaneously pulling the handle 24 away from the cargo. This action causes cargo support 28 to raise up off the ground in the area where it is attached to the frame 8 and angle downwardly at its forward edge, thereby creating an inclined plane to assist the cargo in sliding off the cargo support 28 when the handtruck is pulled away from the cargo.

In a preferred embodiment, angling of frame 8 away from the cargo also causes the pusher structure 26 to engage the side of the cargo nearest to the frame 8 and force it down the inclined plane formed by the cargo support 28. This further facilitates the removal of cargo from the cargo support 28.

Once the load has been removed in the manner described above, the user rotates the frame 8 toward its upright position until the tip of the control rod 34 passes over latch plate 36 and once again locks the cargo support 28 into position.

A further aspect of the present invention concerns the relative dimensions of the pusher structure 26 and the cargo support 28. The height H of the pusher structure 26 and the length L of the cargo support 28 can be varied for any given specific type of cargo to optimize the efficient removal of cargo from the handtruck. For example, by increasing the ratio of height H of the pusher structure 26 with respect to the length of L of the cargo support 28, a load can be more rapidly removed from the cargo support 28. The unloading operation can be made more efficient in this manner because frame 8 does not need to be rotated through as large an angle with respect to the pusher structure 26 to force cargo off of the cargo support 28. Where the height of the cargo is at least H, cargo is completely removed whenever the top edge of pusher structure 26 passes over the forward edge of the cargo support 28.

Figure 4:
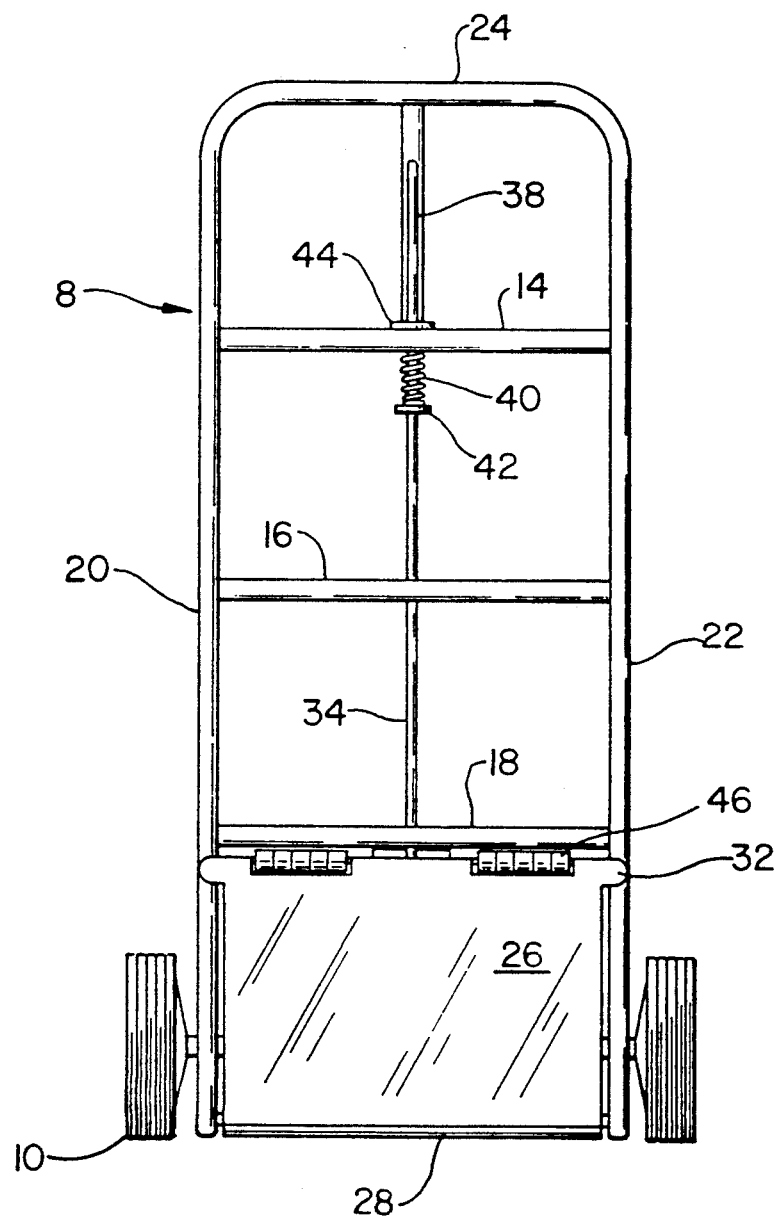
FIG. 4 is an alternative embodiment of the handtruck of FIG. 1 wherein rollers are mounted to the upper edge of the pusher structure of the cargo plate.

In an alternative embodiment of the present invention shown in FIG. 4, rollers 46 can be mounted on the uppermost edge of pusher structure 26. The rollers 46 reduce friction between the pusher structure 26 and the cargo during unloading operations and can also be used to prevent marring or scratching of the cargo surface as the cargo is being forced off the cargo support 28. In a further alternative embodiment, a pad or strip of material having a low coefficient of friction may be fixed to the upper edge of the pusher structure 26 where it comes in contact with cargo during unloading operations.

It will be appreciated that numerous embodiments and modifications of the above handtruck may be devised by those skilled in the art, and it is intended that the appended claims cover all such modifications and embodiments as fall within the true spirit and scope of the present invention.

I claim:

1. An improved handtruck comprised of:

an elongated frame;

wheels mounted adjacent to an end of said frame;

an open-sided cargo support pivotally mounted at the end of said frame adjacent to said wheels, said open-sided cargo support formed from a base plate and a pusher structure mounted substantially perpendicular to said base plate and adjacent to said frame, pivoting of said cargo support occurring substantially at an intersection of said base plate and said pusher structure; and latching means for maintaining said cargo support in a fixed position relative to the frame when the cargo is transported such that said base plate is substantially perpendicular to the elongated frame to support cargo;

said latching means capable of being unlatched to allow said cargo support to pivot with respect to said frame;

whereby cargo is removed from said cargo support when an upper portion of said pusher structure, combined with said pivoting, forces cargo down a downwardly and forwardly inclined plane formed by said base plate when the handtruck is angled downwardly away form the cargo.

2. The handtruck of claim 1 wherein said latching means is comprised of a control rod mounted to said frame with a handle formed at the upper end of said control rod, the control rod being maintained in position by a retaining spring bearing on a spring plate attached to said control rod, said retaining spring causing a tip of said control rod to engage a latch plate mounted on the pusher structure and thereby preventing said cargo plate from pivoting with respect to said frame.

3. The handtruck of claim 1 wherein said latching means is comprised of a control rod slidably mounted on a lower portion of said frame, said control rod operated by a foot pedal mounted to a bottom portion of said frame and upwardly biased by a retaining spring, said retaining spring causing a tip of said control rod to engage a latch plate mounted on a rear face of the pusher structure and thereby lockingly maintaining said cargo support in a stationary position with respect to said frame when cargo is transported, and capable of unlatching said cargo support by said foot pedal being depressed.

4. The handtruck of claim 1, wherein said pusher structure includes retaining plates which extend laterally from the pusher structure and prevent it from rotating beyond a lane defined by said frame.

5. The handtruck of claim 1, wherein said pusher structure is formed from a substantially U shaped metal tube attached at each end to the cargo support.

6. The handtruck of claim 1 wherein an upper edge of said pusher structure includes means for reducing friction between the pusher structure and cargo during unloading operations.

7. The handtruck of claim 6 wherein said pusher structure has rollers mounted on an upper edge thereof to reduce friction and prevent marring of a surface of the cargo being forced off the cargo support.

8. The handtruck of claim 6, wherein said means for reducing friction is a strip of low-friction material fixed to the surface of the pusher structure on an upper edge.

9. The handtruck of claim 1, wherein a height of the pusher structure and a length of the base late may be varied relative to one another to minimize the effort required by a user to unload a specific type of the cargo.

10. The handtruck of claim 9, wherein the height of the pusher structure is greater than the length of the base late to allow the cargo to be more rapidly removed from the cargo support.

11. The handtruck of claim 1 having a frame handle at an end of said elongated frame opposite to an end where said cargo support is mounted.

12. The handtruck of claim 11, wherein a U shaped loop handle is provided, said loop handle being attached at one end to said frame handle and at an opposite end to a frame support member, such that said loop handle can be grasped while the cargo is resting against the frame handle.

* * * * *

UNITED STATES PATENT AND TRADEMARK OFFICE
CERTIFICATE OF CORRECTION

PATENT NO. : 5,256,025

DATED : October 26, 1993

INVENTOR(S) : Gary Williamson

It is certified that error appears in the above-identified patent and that said Letters Patent is hereby corrected as shown below:

Column 2, line 43, "ar" should be --are--.

Claim 9, column 6, line 13, "late" should be --plate--.

Claim 10, column 6, line 18, "late" should be --plate--.

Signed and Sealed this

Tenth Day of May, 1994

Attest:

BRUCE LEHMAN

*Attesting Officer*     *Commissioner of Patents and Trademarks*